Figure 1:
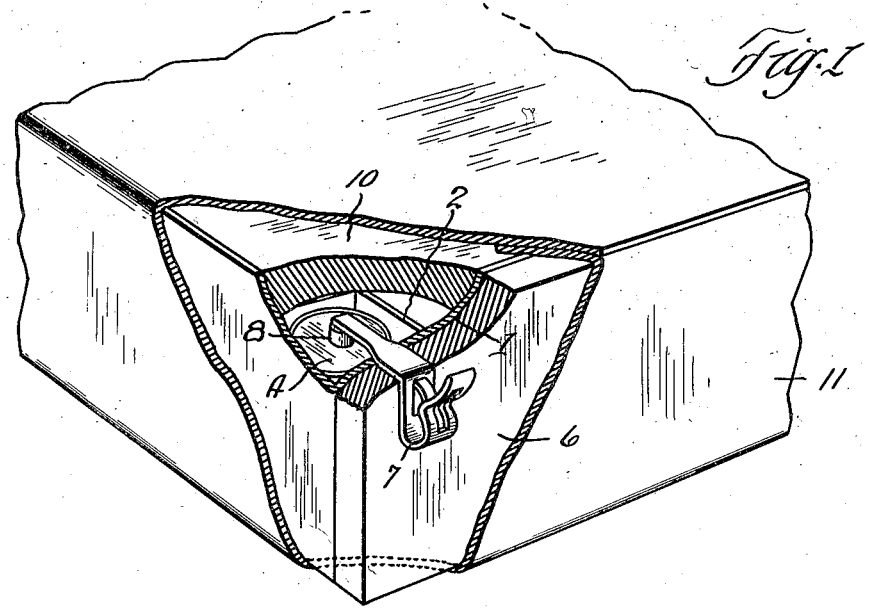

June 16, 1931.     C. P. DEIBEL     1,809,924
METHOD OF MAKING DRY BATTERY STRUCTURES
Filed Aug. 28, 1928

Inventor
Cyril P. Deibel
By Auld Brock & West
Attorney

Patented June 16, 1931

1,809,924

UNITED STATES PATENT OFFICE

CYRIL P. DEIBEL, OF LAKEWOOD, OHIO

METHOD OF MAKING DRY BATTERY STRUCTURES

Application filed August 28, 1928. Serial No. 302,543.

This invention relates to a battery unit and the method of assembling the same and has particular reference to what is known to the trade as the radio B battery of the vertical or upright type. This application is a continuation in part of my application Serial No. 251,288 for battery unit, filed February 2, 1928.

One of the main objects of the invention is to simplify the construction of battery units of this type and also to provide novel terminals and method of connecting the same with the battery in such a manner that the terminals will not be either loosened or disconnected from the battery.

A further object of the invention is to provide an improved construction of battery unit which will effect an economy in the salvage of defective batteries and which enables batteries, which would otherwise be scrapped to be easily repaired and made salable.

According to present methods of constructing and assembling batteries, it has been customary to connect a plurality of dry cells in series and to seal them in a container or casing with suitable terminals. The usual dry cell batteries employ zinc cups which serve both as containers and negative elements. When the cells are assembled in series, it is essential that insulating material be used between adjacent cells, for otherwise if two or more zinc cans touch each other the cells will be short circuited and the entire battery rendered useless. Various methods have been employed for insulating adjacent cells. One method is to wrap the sides and bottom of each cell in paper. Another method has been to enclose each cell in a paper cylinder. Still another method is to use so-called egg crating which is made out of cut cardboard which can be folded for shipment and storage and which when opened up forms intersecting partitions in the box. The egg crating provides insulating partitions between sides of adjacent cells but does not cover the bottoms of the cells. The individual cells are connected in series by wires which are soldered at one end to the negative zinc can of one cell and at the other end to a positive terminal of the next cell, and so on. Before inserting the cells into the container or box, it has been customary to coat the bottom of the box with a layer of pitch or tar and then press the lower edges of the egg crating into the adhesive material, thereby sealing the bottom of each compartment. After the cells have been placed in the container or box, they are connected in series and the terminals are secured in place. The connecting wires are then bonded into one mass by pouring a subseal of suitable pitch, tar or wax over and around the individual cells. On top of the mass described above there is then poured a further mass of insulating pitch or wax. This top layer of wax has a thickness of approximately one-half an inch and is sometimes supported by cardboard placed on top of the cells before the wax is inserted. The mass just described is then inserted into an outer box or casing and the open top of the casing is sealed by a suitable sealing material. Such a construction is disclosed in my Patent No. 1,625,848, issued April 26, 1927.

The main object of this invention is to provide improved terminals for battery units of this general character and a method of connecting the same with the cell electrodes in such a manner that the terminals will be rigidly connected and held in place and in which a reinforcing member is provided for this purpose, the terminals and also the holes in the reinforcing member being so shaped and arranged as to resist a turning movement thereof with respect to the reinforcing member.

Figure 2:
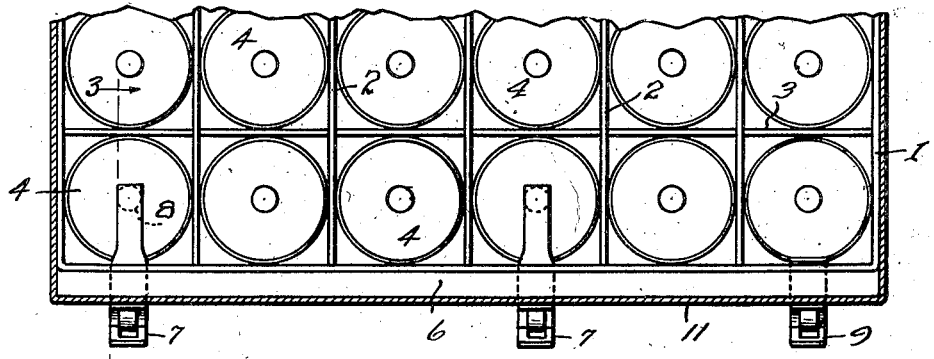
Figure 3:
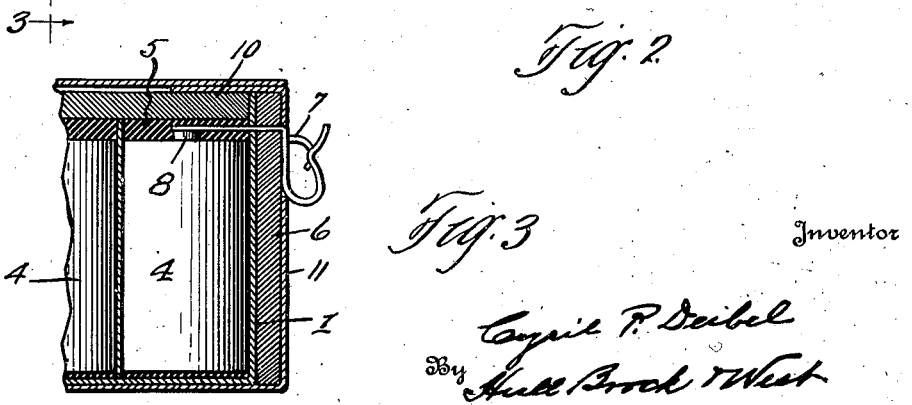

Further and more limited objects of my invention will appear as the description proceeds and by reference to the accompanying drawings in which Fig. 1 is an enlarged fragmentary perspective view with parts broken away to disclose the manner of attaching the terminals to the cell; Fig. 2 is a fragmentary top plan view also illustrating the manner of attaching the terminals to the cells; and Fig. 3 is a vertical sectional view on the line 3—3 of Fig. 2.

According to my invention the outer casing is made of such a size as to leave a space at one end thereof. Disposed within this space is a reinforcing member consisting of a layer or strip of paper fibre or container board or cardboard. According to my preferred construction this reinforcing member has a thickness of approximately .07 inches. This construction materially reduces the cost of the battery unit as in the standard 45 volt B battery a sheet of fibre board weighing approximately one ounce replaces about 16 ounces of sealing wax. At present market prices this effects a saving of about three cents per battery. The extra equipment, floor space, and gas consumed in heating this material is also saved. A reduction in weight also means a decreased cost in express and freight charges.

Referring now to the drawings, the numeral 1 designates an inner container which is preferably rectangular in shape and which may be of any suitable size. Arranged within the container 1 are a plurality of partitions 2 and 3 which divide the same into a plurality of compartments into which cells 4 are inserted and electrically connected with each other, preferably in series. Openings or slots are cut into the side wall of the container 1 opposite the points where it is desired to connect the terminal clips. In order to provide means for supporting and holding the terminal clips I provide a reinforcing member 6 which is preferably made of strong fibre board, container board or wood. This reinforcing member 6 has a plurality of slots therein which are disposed opposite to the slots in the container 1 when the reinforcing member is secured in place. Carried by the reinforcing member 6 are terminal clips 7 and 9 of the Phanstock type. These clips have flat portions or stems which are disposed within the slots. The slots are of substantially the same shape and size as the flat portions of the clips and serve to prevent rotation of the clips with respect to the reinforcing member. The inner ends of the clips 7 are soldered to caps 8 which are secured over the carbon electrodes of the cells and the inner end of the clip 9 is soldered to the zinc cup of one of the cells. According to the preferred method of assembling the battery unit, the clips are first inserted through the slots in the reinforcing member 6 with the connecting portions projecting therefrom. The reinforcing member is then placed over the end wall of the container 1 and the projecting portions of the clips inserted through the slots in the container wall and soldered to the cell electrodes respectively. It is, of course, understood that the reinforcing member 6 may be first secured in place and the clips inserted therethrough, if desired.

From the above description, it will be seen that two of the usual three terminals are soldered to the brass-caps on top of carbons in each of two cells. If the holes in the reinforcing member are round the terminals can easily be slightly rotated, thereby loosening the carbon in the cell or the cap on the carbon—causing a loose connection—with attendant lowered amperage and impaired service. If the holes and the terminal stems are made rectangular or square or angular and are a tight fit, the terminals cannot rotate or exert a torque on the soldered connections to the brass caps on carbon electrodes and there can be no loosening of carbon or brass cap and attendant bad results. After the terminals are secured in place, a layer of pitch may be poured over the top of the cells to completely fill the same as shown in Fig. 3. Secured over the top of the inner container and substantially filling the same is a cover 10 which is preferably made of corrugated strawboard or other suitable material. After the solder and pitch have been allowed to cool sufficiently the inner container with the terminals connected thereto is inserted into an outer container 11 which is preferably made of paper. Openings are cut in the top of the outer container of sufficient size to permit the terminals 7 and 9 to project therethrough. The reinforcing member 6 serves to strengthen and reinforce the terminals and prevent the same from being accidentally disconnected. The outer container may be made of paper, cardboard, strawboard or any other suitable material and per se forms no part of the present invention. The outer container or casing is of such size that the inner container 1 and reinforcing member 6 substantially fill the same.

It will now be clear that the reinforcing member serves as a means for rigidly holding the terminals in place and preventing an accidental dislodgment or loosening. The shape of the terminals themselves and the shape of the slots through which they are inserted both contribute to provide a connection which has proven very satisfactory and displacement of the terminals is effectively prevented.

Various changes may be made in the details of my construction without departing from the spirit of my invention and I do not wish my invention to be limited except in accordance with the scope of the appended claims.

Having thus described my invention, what I claim is:—

1. The method of making dry battery structures, consisting in arranging a plurality of cells in a container, mounting a plurality of line attaching clips upon a supporting member, and interconnecting said cells by wires soldered thereto and soldering said clips while upon said member to certain of said cells, thereby permanently assembling said supporting member with said clips.

2. The method of making dry battery structures, consisting in arranging a plurality of cells in a container having one of its walls provided with a plurality of apertures, mounting a plurality of line attaching clips upon a supporting member with portions of said clips projecting from said member, inserting said projecting portions through the apertures in said container wall, and soldering said clip portions to certain of said cells.

3. The method of making dry battery structures, consisting in arranging a plurality of battery cells in a container having one of its walls provided with a plurality of apertures, inserting the connecting end portions of a plurality of line attaching clips through a plurality of openings in a supporting member for said clips, with said clip connecting portions projecting from said member, inserting said projecting clip portions through the apertures of said container wall, and soldering said inserted clip portions to certain of said battery cells.

4. The method of making dry battery structures, consisting in arranging a plurality of battery cells in an open top tray having one of its side walls provided with a plurality of apertures, inserting the connecting end portions of a plurality of line attaching clips through a plurality of openings in a supporting member for said clips, with said clip connecting portions projecting from said member, inserting said projecting clip portions through the apertures of said tray wall, soldering said inserted clip portions to certain of said battery cells, and providing said tray with a cover member.

5. The method of making dry battery structures, consisting in arranging partition means in a container so as to provide a series of compartments in said container, arranging a battery cell in each of said compartments, said container having one of its walls provided with a plurality of apertures, inserting the connecting portions of a plurality of line attaching clips through openings in a supporting member for said clips, with said clip connecting portions projecting from said member, inserting said projecting clip portions through the apertures of said container wall, and soldering said inserted clip portions to certain of said cells, which secures said supporting member in assembled relation with said clips.

6. The method of making dry battery structures, consisting in arranging a plurality of battery cells in a container having one of its walls provided with a plurality of apertures, inserting the connecting portions of a plurality of line attaching clips through openings in a supporting member for said clips with said clip connecting portions projecting from said member, inserting said projecting clip portions through the apertures of said container wall, soldering said inserted clip portions to certain of said battery cells, which secures said supporting member in assembled relation with said clips, interconnecting said cells by wires soldered thereto, and pouring a sealing compound into said container, so as to more or less fill the spaces between cells and cover said cells to a greater or less degree.

7. The method of making dry battery structures, consisting in arranging a plurality of battery cells in an open top container having one of its side walls provided with a plurality of apertures, inserting the connecting portions of a plurality of line attaching clips through openings in a supporting member for said clips, with said clip connecting portions projecting from said member, inserting said projecting clip portions through the apertures of said container wall, soldering said inserted clip portions to certain of said battery cells, which secures said supporting member in assembled relation with said clips, interconnecting said cells by wires soldered thereto, pouring a sealing compound into said container, so as to more or less fill the spaces between cells and cover said cells to a greater or less degree, and applying a cover member to said container.

8. The method of making dry battery structures, consisting in arranging a plurality of battery cells in a container having one of its walls provided with a plurality of apertures, inserting the connecting portions of a plurality of line attaching clips through openings in a supporting member for said clips, with said clip connecting portions projecting from said member, inserting said projecting clip portions through the apertures of said container wall, soldering said inserted clip portions to certain of said battery cells, which secures said supporting member in assembled relation with said clips, interconnecting said cells by wires soldered thereto, and placing the aforementioned parts in an enclosing casing.

9. The method of making dry battery structures, consisting in arranging a plurality of battery cells in a container having one of its walls provided with a plurality of apertures, inserting the connecting portions of a plurality of line attaching clips through openings in a supporting member for said clips, with said clip connecting portions projecting from said member, inserting said projecting clip portions through the apertures of said container wall, soldering said inserted clip portions to certain of said battery cells, which secures said supporting member in assembled relation with said clips, interconnecting said cells by wires soldered thereto, and placing the aforementioned parts in an enclosing casing provided with a plurality of openings in one of its walls to permit the line-attaching portions of said clips to project therethrough.

10. The method of making dry battery structures, consisting in arranging a plurality of battery cells in a container having one of its walls provided with a plurality of apertures, inserting the connecting portions of a plurality of line attaching clips through openings in a supporting member for said clips, with said clip connecting portions projecting from said member, inserting said projecting clip portions through the apertures of said container wall, soldering said inserted clip portions to certain of said battery cells, which secures said supporting member in assembled relation with said clips, interconnecting said cells by wires soldered thereto, and inserting the aforementioned parts in an enclosing casing having all but one of its walls permanently closed, said one wall being openable to permit the insertion of said parts and being provided with openings to permit the line-attaching portions of said clips to project therethrough.

11. The method of making dry battery structures, consisting in arranging a plurality of battery cells in an open top container having one of its side walls provided with a plurality of apertures, inserting the connecting portions of a plurality of line attaching clips through openings in a supporting member for said clips, with said clip connecting portions projecting from said member, inserting said projecting clip portions through the apertures of said container wall, soldering said inserted clip portions to certain of said battery cells, which secures said supporting member in assembled relation with said clips, interconnecting said cells by wires soldered thereto, applying confining means to said container, and pouring a sealing compound into said container so as to more or less fill the spaces between cells and cover said cells to a greater or less degree.

12. The method of making dry battery structures, consisting in arranging a plurality of cells in multiple-cell battery formation, threading a plurality of line-attaching clips through openings in a supporting member which becomes a permanent part of the completely formed battery, and soldering said clips while upon said member to certain of said cells, thereby permanently assembling said supporting member and clips with each other and with the cells.

In testimony whereof, I hereunto affix my signature.

CYRIL P. DEIBEL.